April 7, 1959    K. B. BREDTSCHNEIDER    2,880,620
FLUID SEAL FOR VALVES OR THE LIKE
Filed Nov. 19, 1954
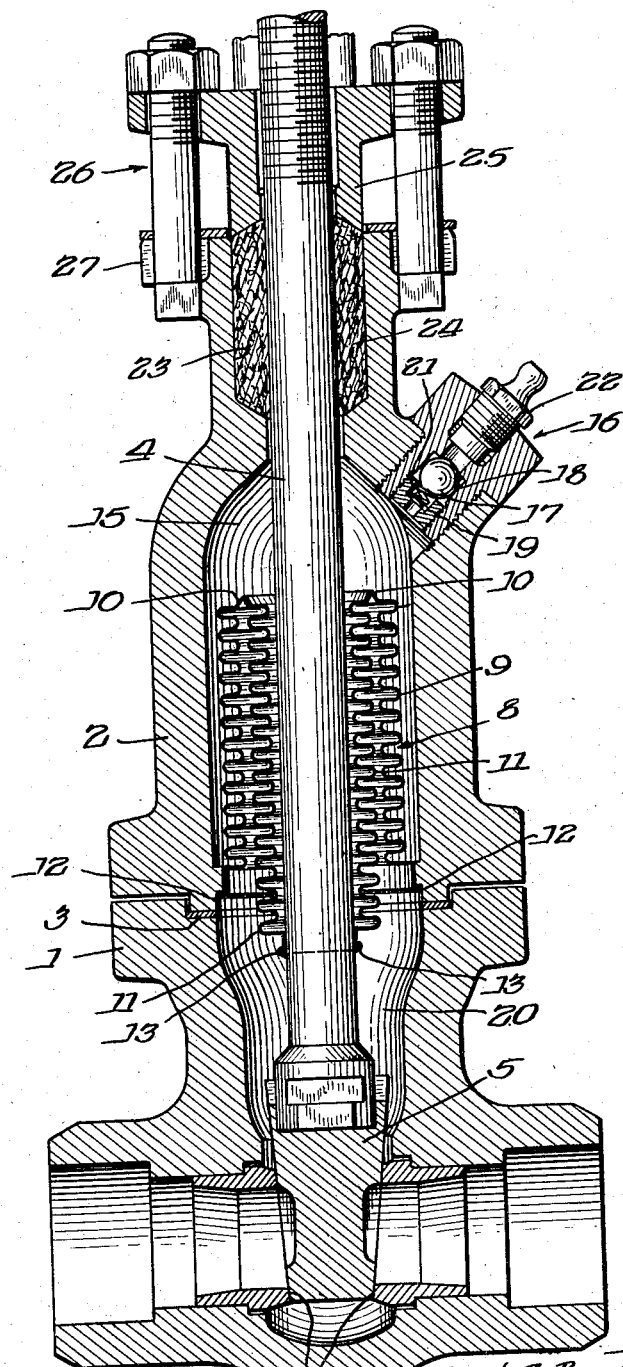
Inventor.
Kurt B. Bredtschneider.
By Joseph O. Lange
Atty.

United States Patent Office 2,880,620
Patented Apr. 7, 1959

2,880,620

FLUID SEAL FOR VALVES OR THE LIKE

Kurt B. Bredtschneider, Chicago, Ill., assignor to Crane Co., Chicago, Ill., a corporation of Illinois Application November 19, 1954, Serial No. 469,964

3 Claims. (Cl. 74—18.2)

The present invention relates to a valve and more particularly to a novel leakproof valve construction particularly adapted for the handling of poisonous or highly diffusive fluids under pressure.

It will become apparent that the structural combination outlined in the following specification has heretofore been unknown to the art of seals and valves and has a multitude of applications to structures other than the illustrated gate valve.

It is one of the main objects of my invention to provide a valve employing a flexible, chamber-defining bellows member which is capable of functioning as a fluid-tight seal, despite the presence of high pressure or vaccum by its cooperation with an incompressible liquid reinforcement as will hereinafter be described.

It is a further object of my invention to provide a novel seal or bellows design in which the volume of the reinforcing chamber is maintained substantially constant in the course of the reciprocal axial movement of the chamber defining bellows member.

It is a still further object of my invention to present a flexible bellows member capable of reciprocal axial movement which is not subject to any frictional or abrading stresses and thereby resulting in a useful and long life.

The above and other objects will become more readily apparent upon proceeding with the following detailed description read in the light of the accompanying drawing in which The figure is a fragmentary sectional assembly view of a gate valve employing my invention.

Relating now to the figure, a conventional wedge disc gate valve is fragmentarily depicted embodying my invention. It should be understood at the outset that the inventive principle embodied in the illustrated valve is also applicable to pump pistons and any other kind of mechanical action inside of a pressure or vacuum vessel. The illustrated valve comprises the usual body or casing 1 and bonnet 2 maintained in fluid sealing engagement by means of the interposed gasket member 3. The stem member 4 is non-rotatable and has the disc or closure member 5 affixed to its lower end limit as shown. The usual body seat ring members 6 abuttingly engage the wedge disc 5.

The double-walled bellows member 8 consists of an outer annular portion 9 and an inner annular portion 11 joined at an upper annular end limit 10. The lower end portion of the outer annular bellows member 9 is welded or otherwise suitably affixed in fluid sealing engagement to the bonnet member inner peripheral surface at 12. The lower end of the inner annular portion of the double walled bellows member 8 is joined in fluid sealed relation to the outer periphery of the stem member 4 at 13. It should be understood that the position of the bellows member 8 may be inverted in the bonnet chamber and the same result will be effected.

It will be noted that the tdouble walled bellows member 8 in conjunction with the inner surface of the bonnet member 2 of the periphery of the stem member 4 thus forms a fluid tight bonnet chamber 15. Supplying fluid to the said chamber 15 is made convenient from the exterior surface of the bonnet member 2 by means of the pressure responsive inlet member 16. This latter member comprises a conventional ball valve 17 cooperating with the seating surface 18. The spring member 19 is set in recess 21 and maintains the ball valve 17 against seating surface 18 at a predetermined spring tension. The inner plug member 22 is suitably formed for engaging an inlet adapted to permit the insertion of a suitable noncompressible liquid in the bonnet chamber 15.

It will thus be seen that in the normal course of operation that the volume of the bonnet chamber 15 will be maintained substantially constant despite the reciprocal movement of the non-rotating stem member 4. An analysis of the double walled bellows member 8 reveals that upon the occurrence of a downward axial movement of the stem member 4, the inner annular portion of the bellows member 8 expands in a downward direction, concomitantly the outer annular portion of the bellows member 8 contracts. Upon the occurrence of an upward axial movement of the reverse takes place. Consequently, the volume of the chamber 15 is maintained substantially constant in the course of all stem movement without the accompaniment of stresses, strains or abrading action on the annular portions of the bellows member 8. It should be appreciated that the bellows member 8 is preferably constructed of a thin flexible material. The reinforcing non-compressible material inserted in the bonnet chamber 15 through the inlet member prevents the rupture or distortion of the thin double walled member 8 in the event of any excessive pressure which may be present in the system. Similarly, collapse of the bellows member is prevented by means of the support provided by a non-compressible fluid, such as mercury, grease, oil, and so forth. The non-compressible fluid is substantially gas free and is prevented from escaping the bonnet chamber 15 by means of the stuffing box 23, which has the usual packing 24 maintained in tight abutting relation by means of the gland member 25. The latter member being suitably held in place by the nut and bolt assembly 26 cooperating with the stuffing box flange 27. The travel of the double-walled bellows 8 may be revealed by a variety of mechanical, electrical or magnetic means thereby disclosing whether the bellows member 8 is functioning properly and whether any quantities of the non-compressible reinforcing fluid has been lost through the stuffing box 23.

It should be appreciated that my construction readily lends itself to easy modification and substitution of the parts illustrated. For instance, a plastic diaphragm or a rubber cup-like structure may be substituted for the double walled flexible bellows member 8.

The benefits of my illustrated valve structure are obvious to those skilled in the art. Despite the presence of great line pressures entering the casing chamber 20 when the disc member 5 is in open position, a leakproof valve is assured at all times by virtue of the bellows double-walled member 8 which consequently assures a reinforcing chamber 15 at substantially constant volume. Thus, I have provided a leakproof valve capable of efficiently operating under exceedingly high line pressures, and which particularly are adapted for the handling of poisonous and highly diffusive fluids. The ready flexibility of the illustrated structure having already been demonstrated, I therefore wish to be restricted in my invention only by the scope of the appended claims.

I claim:

1. In a fluid-tight seal between a reciprocally movable shaft member and a surrounding housing member, the latter member having fluid sealing expandible means at one end limit thereof and a packing means at the other end limit thereof for said shaft member, the said sealing expandible means being mounted with its axis in a vertical position and comprising a bellows member with inner and an outer expansible wall portions arranged in telescoped assembly with an annular space in between and with the inner and outer wall portions being joined at an upper portion thereof, said bellows member at a lower outer portion thereof being positioned in fluid sealing engagement with an inner wall surface of said housing member, the said inner expansible wall portion of said bellows member being connected to said shaft member at a lower end limit whereby to seal off an end of the said housing member and since the other end is sealed off by the packing means, there is provided a fluid tight chamber in said housing member, the said inner wall surface of said housing member including annular shoulder means on the housing member adjacent the fluid sealing engagement with said bellows member for snugly enclosing said lower outer portion of the bellows member to guide and position the said bellows member relative to the remainder of said housing inner wall surface, and means cooperating with the housing member enabling a non-compressible fluid to be introduced in said fluid-tight chamber.

2. In a bellows-type sealing means substantially as described, the combination comprising a housing with its axis in a vertical position and an actuator stem assembled in fluid tight engagement, the said latter member reciprocally movable within said housing, the said sealing means comprising a bellows member closing off the lower end of said housing and formed by inner and outer portions arranged in telescoped relation to each other and with the inner portion having an end peripheral limit affixed in fluid sealing tight engagement to said stem, the outer portion of said bellows member having a lower peripheral end limit affixed in fluid sealing engagement to a wall surface of said housing, means on the said housing for supplying a substantially incompressible liquid to the space between the bellows member and the housing and between the shaft and the inner portion of the said bellows member, and packing means around said shaft defining the upper limit of the said space between the said shaft and the bellows member and cooperating with an upper end portion of said housing to effect an annular seal therefor.

3. In a shaft fluid seal and housing of the character described, the combination of a bellows having inner and outer portions nested in the housing and arranged in telescoped relation to each other, the inner portion of the bellows engaging a shaft extending through the said bellows and one end of the housing, a chamber defined by the housing with its axis in a vertical position and formed around the inner and outer nested portions of the bellows and said shaft, said chamber being filled with a substantially incompressible liquid, the outer nested portion of the bellows having a portion guided and affixed peripherally to a projecting annular wall of the chamber, the inner and outer portions of the said bellows being joined peripherally at an opposite end portion of the bellows in relation to that portion thereof affixed to the said projecting annular wall of the chamber, and packing means on the housing for sealing the end portion of the said chamber through which said shaft projects.

References Cited in the file of this patent

UNITED STATES PATENTS

| | | |
|---|---|---|
| 1,572,922 | Govers | Feb. 16, 1929 |
| 2,228,849 | Sandos | Jan. 14, 1941 |
| 2,444,703 | Jones | July 6, 1948 |
| 2,691,773 | Lichtenberger | Oct. 12, 1954 |

FOREIGN PATENTS

| | | |
|---|---|---|
| 1,012,047 | France | of 1952 |